United States Patent
Jhan et al.

(10) Patent No.: US 8,879,018 B2
(45) Date of Patent: Nov. 4, 2014

(54) ELECTRONIC APPARATUS AND DISPLAY THEREOF

(75) Inventors: Ren-Hong Jhan, Hsin-Chu (TW); Jung-Hui Hsu, Hsin-Chu (TW); Kuo-Sen Kung, Hsin-Chu (TW); Chun-Hao Tu, Hsin-Chu (TW); Jen-Pei Tseng, Hsin-Chu (TW); Yu-Jung Liu, Hsin-Chu (TW); Jiun-Jye Chang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 397 days.

(21) Appl. No.: 13/411,688

(22) Filed: Mar. 5, 2012

(65) Prior Publication Data

US 2013/0010409 A1    Jan. 10, 2013

(30) Foreign Application Priority Data

Jul. 4, 2011   (TW) .............................. 100123499 A

(51) Int. Cl.
| | |
|---|---|
| *G02F 1/1333* | (2006.01) |
| *G02F 1/133* | (2006.01) |
| *G06F 1/16* | (2006.01) |
| *G06F 1/32* | (2006.01) |
| *G06F 1/26* | (2006.01) |

(52) U.S. Cl.
CPC ................ *G06F 1/1637* (2013.01); *G06F 1/32* (2013.01); *G06F 1/263* (2013.01)
USPC ............................................ 349/58; 349/116

(58) Field of Classification Search
USPC .................................................... 349/116, 24
See application file for complete search history.

(56) References Cited

U.S. PATENT DOCUMENTS 6,859,365 B2 *  2/2005  Koiwa et al. ............. 361/679.27

FOREIGN PATENT DOCUMENTS

| | | |
|---|---|---|
| EP | 1956401 | 8/2008 |
| JP | 2011008086 A | 1/2011 |
| TW | M382512 | 6/2010 |
| TW | M392383 | 11/2010 |
| TW | M414798 | 10/2011 |

OTHER PUBLICATIONS

English translation of abstract of TW M392383.
English translation of abstract of TW M382512.
English translation of abstract of EP 1956401.
English translation of abstract of TW M414798 (published Oct. 21, 2011).
Taiwan Office Action dated May 20, 2013.
English translation of abstract and pertinent parts of JP 2011008086 A (published Jan. 13, 2011).
China Office Action dated Aug. 6, 2013.

\* cited by examiner

*Primary Examiner* — Wen-Ying P Chen
(74) *Attorney, Agent, or Firm* — McClure, Qualey & Rodack, LLP

(57) ABSTRACT

An electronic apparatus and a display thereof are disclosed. The display includes a back plate, a photoelectric converting module, and a display module. The back plate has an inner surface and an open is formed on the back plate. The back plate has an inner edge around the open. The inner edge is concave toward the direction back to inner surface to form a supporting part. The photoelectric converting module is disposed on the supporting part without protruding out of the inner surface. The photoelectric converting module has a light-receiving surface exposed to the open. The display module is disposed on the inner surface of the back plate and the display module covers the photoelectric converting module. The display module has a display surface back to the photoelectric converting module.

19 Claims, 4 Drawing Sheets

ELECTRONIC APPARATUS AND DISPLAY THEREOF

BACKGROUND OF THE INVENTION

1. Field of the Invention

The invention relates to a display; in particular, to a display integrated with a solar module and an electronic apparatus including the display.

2. Description of the Prior Art

In recent years, with the continuous progress of display technology, the liquid crystal display is mass produced and widely used. It is no doubt that the liquid crystal display has become the mainstream of the flat panel display technology. Because the liquid crystal display has an advantage of small thickness, the notebooks emphasizing on the features of small and easy to carry almost use the liquid crystal display as their display apparatus. Please refer to FIG. 1. FIG. 1 illustrates a cross-sectional view of the display of the conventional notebook. As shown in FIG. 1, in the display D, the display module 104 is disposed on the back plate BE, and there is no open formed on the inner surface IS of the back plate BE.

In general, the power used in current notebook is provided by battery or mains electricity. When the notebook is not connected to the mains electricity, the notebook can only use the power provided by the battery to operate. In fact, the time that the notebook can be used after being booted is limited. Therefore, if a solar charging module can be integrated into the notebook, the notebook can be charged under the light environment to increase the using time of the notebook.

However, after the conventional solar charging module applied in the power plant to generate electricity is integrated with the LCD monitor of the notebook, their thickness and weight will exceed the specification originally designed for the cover of the notebook. If the solar charging module is directly assembled on the cover of the notebook, not only the structure stability and the strength of the solar charging module will become poor and its reliability will be lowered, but also the display assembling process in factories will be also changed, the entire manufacturing cost of notebook will be increased and their market competitiveness will be reduced accordingly.

SUMMARY OF THE INVENTION

Therefore, the invention provides an electronic apparatus and a display thereof to solve the above-mentioned problems.

A scope of the invention is to disclose an electronic apparatus. In an embodiment, the electronic apparatus includes a display. The display includes a back plate, a photoelectric converting module, and a display module. The back plate has an inner surface and an open is formed on the back plate. The back plate has an inner edge around the open. The inner edge is concave toward the direction back to inner surface to form a supporting part. The photoelectric converting module is disposed on the supporting part without protruding out of the inner surface. The photoelectric converting module has a light-receiving surface exposed to the open. The display module is disposed on the inner surface of the back plate and the display module covers the photoelectric converting module. The display module has a display surface back to the photoelectric converting module.

In another embodiment, the electronic apparatus includes a display. The display includes a back plate, a photoelectric converting module, and a display module. The back plate has an inner surface. A part of the back plate is concave toward a direction back to the inner surface to form a concave part, and an open and a supporting part around the open are formed at the concave part. The photoelectric converting module is disposed in the concave and supported by the supporting part. The photoelectric converting module has a light-receiving surface exposed to the open. The display module is disposed on the inner surface of the back plate and covering the photoelectric converting module. The display module has a display surface back to the photoelectric converting module, and the display module and the supporting part clamp the photoelectric converting module.

Another scope of the invention is to disclose a display. In an embodiment, the display includes a back plate, a photoelectric converting module, and a display module. The back plate has an inner surface and an open is formed on the back plate. The back plate has an inner edge around the open. The inner edge is concave toward the direction back to inner surface to form a supporting part. The photoelectric converting module is disposed on the supporting part without protruding out of the inner surface. The photoelectric converting module has a light-receiving surface exposed to the open. The display module is disposed on the inner surface of the back plate and the display module covers the photoelectric converting module. The display module has a display surface back to the photoelectric converting module.

In another embodiment, the display includes a back plate, a photoelectric converting module, and a display module. The back plate has an inner surface. A part of the back plate is concave toward a direction back to the inner surface to form a concave part, and an open and a supporting part around the open are formed at the concave part. The photoelectric converting module is disposed in the concave and supported by the supporting part. The photoelectric converting module has a light-receiving surface exposed to the open. The display module is disposed on the inner surface of the back plate and covering the photoelectric converting module. The display module has a display surface back to the photoelectric converting module, and the display module and the supporting part clamp the photoelectric converting module.

Compared to the prior arts, the electronic apparatus and the display thereof disclosed by the invention are integrated with a thin-type solar module having a thickness of 4 mm or less, and the solar module and the display module use the same back plate without adding additional components. The original display assembling process used in factories is not necessary to be changed to simplify the process and save the cost, and the structure stability and strength of the solar module can be also increased to enhance its reliability. By doing so, when the electronic apparatus is under the light environment, the solar module can convert the collected optical energy into the electrical energy and store the electrical energy in the battery of the electronic apparatus to extend the using time of the electronic apparatus under the condition without connecting with the mains electricity.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is an electronic apparatus. In this embodiment, the electronic apparatus is a notebook; a display of the electronic apparatus is a liquid crystal display or a self-emitting display, and the display can include a touch device or a force feedback device, but not limited to this.

Figure 2:
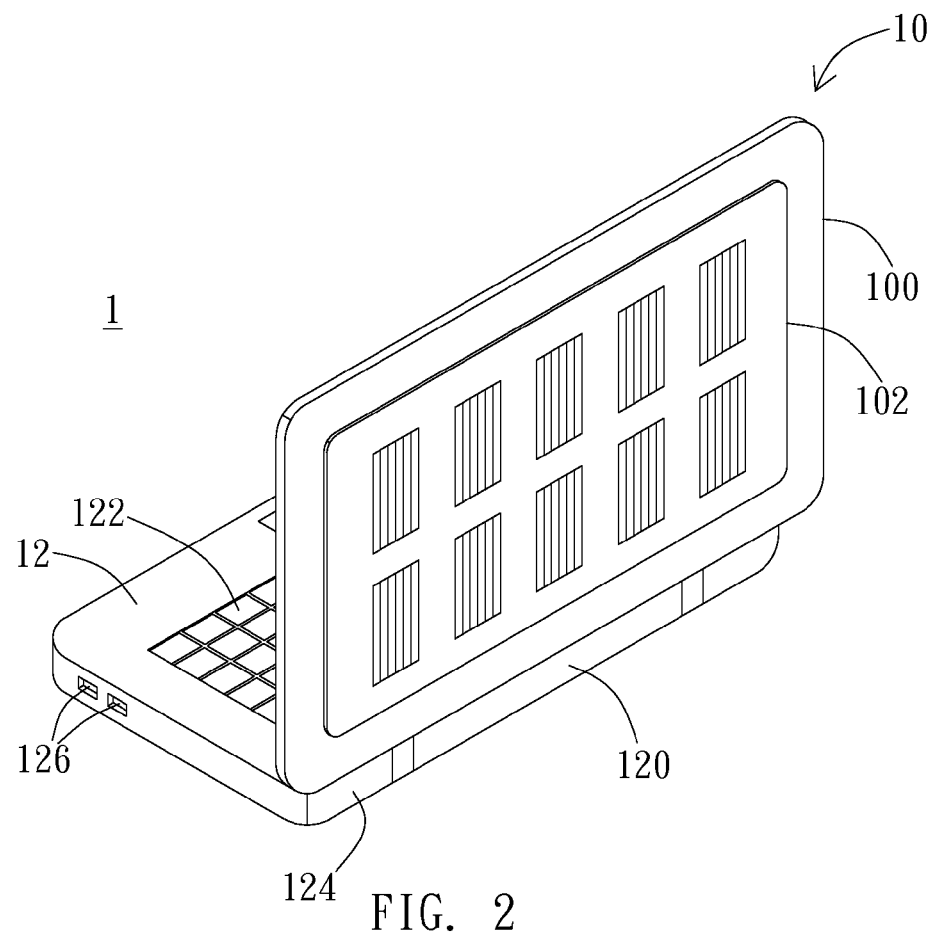
FIG. 2 illustrates an appearance view of the electronic apparatus in a preferred embodiment of the invention.

Please refer to FIG. 2. FIG. 2 illustrates an appearance view of the electronic apparatus in this embodiment. As shown in FIG. 2, the electronic apparatus 1 includes a display 10 and a base 12. Wherein, a battery 120, a keyboard 122, a pivot 124, and a USB slot 126 are disposed on the base 12, but not limited to this. As shown in FIG. 2, the display 10 includes a back plate 100, a photoelectric converting module 102, and a display module 104. The photoelectric converting module 102 and the display module 104 are disposed on the back plate 100 and they are adjacent to each other. The photoelectric converting module 102 has a light-receiving surface RS back to the display module 104 and the display module 104 has a display surface DS back to the photoelectric converting module 102. The light-receiving surface RS of the photoelectric converting module 102 receives the light L from outside, and the display surface DS of the display module 104 displays images.

Figure 3:
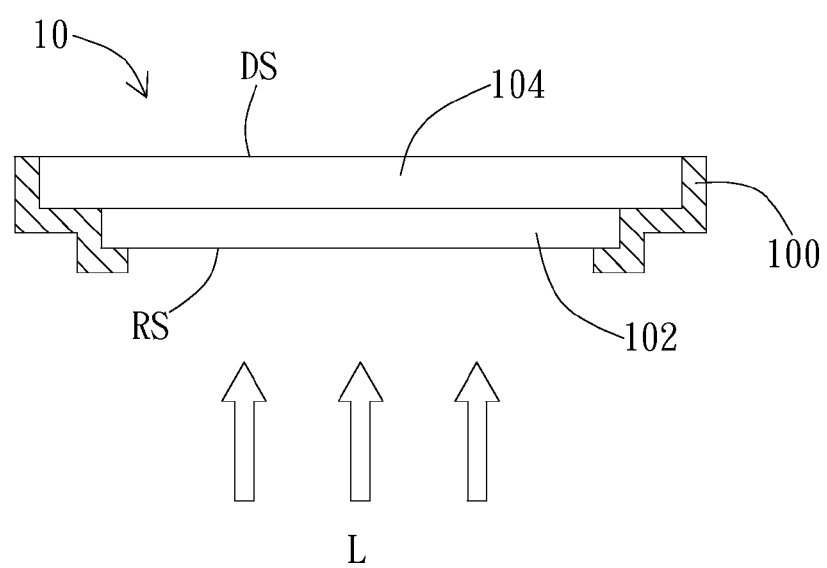
FIG. 3 illustrates a cross-sectional view of the display.

Then, please refer to FIG. 3. FIG. 3 illustrates a cross-sectional view of the display. It should be noticed that as shown in FIG. 3, for the consideration of fixing, the cross-sectional area of the photoelectric converting module 102 is preferred smaller than that of the display module 104 in the invention. As to the area proportion between the photoelectric converting module 102 and the display module 104, it can be determined based on practical needs without specific limitations.

In fact, the display module 104 can be a liquid crystal display module or a self-emitting display module; the photoelectric converting module 102 can be formed by at least one solar module, and the at least one solar module can be any combination among a poly-silicon solar cell, a thin-film solar cell, and a dye-sensitized solar cell without specific limitations.

It should be noticed that different from the conventional solar module applied in the power plant to generate electricity having a thickness over 5 mm, the thickness of the photoelectric converting module 102 used in the invention is preferred to be limited not larger than 4 mm to prevent the thickness and the weight of the photoelectric converting module 102 from exceeding the specification originally designed for the cover of the electronic apparatus 1.

Because the main feature of the invention is the inner structure of the display 10, therefore, the modules of the display 10 will be introduced respectively as follows.

Figure 4:
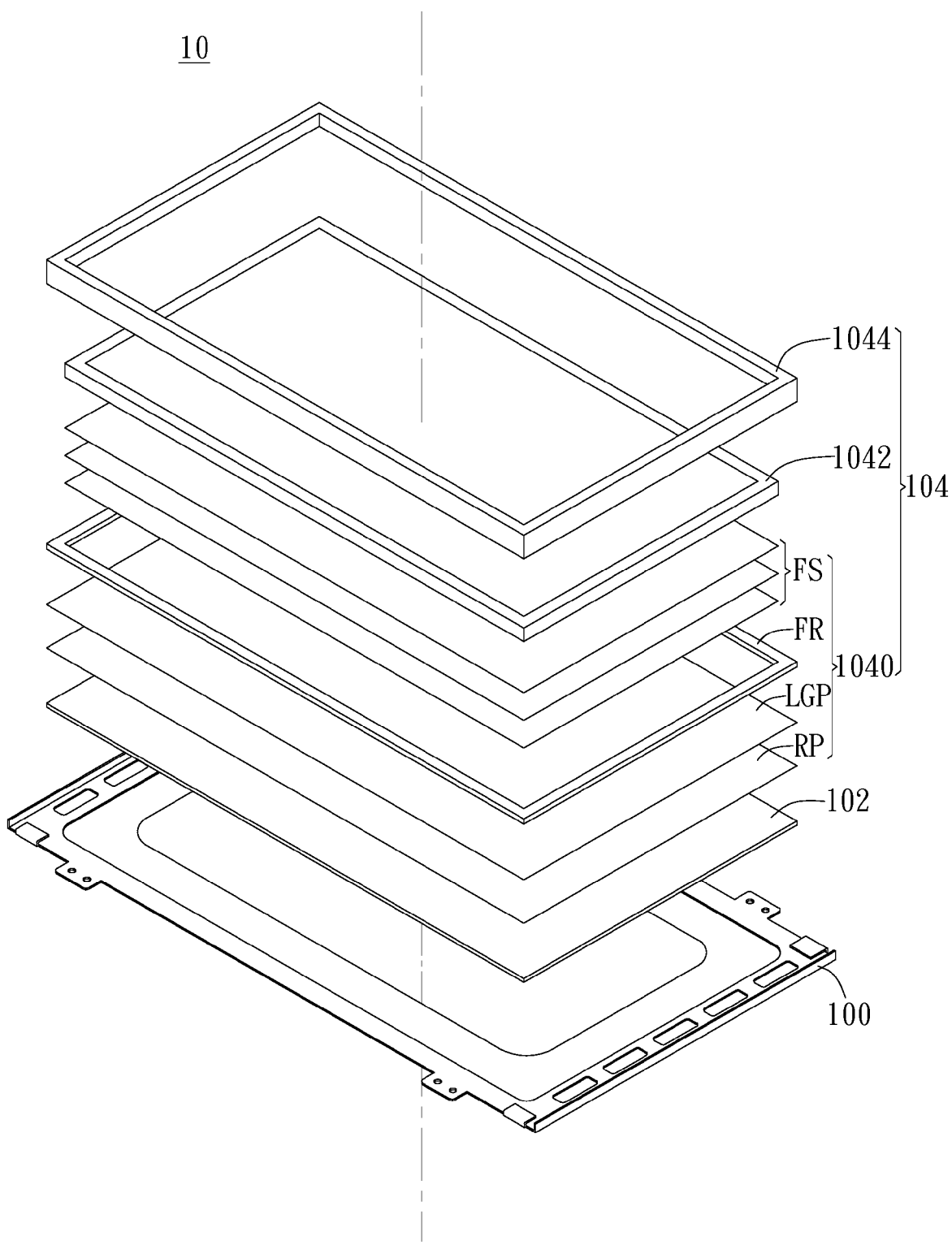
FIG. 4 illustrates an exploded view of the display in a preferred embodiment of the invention.

At first, please refer to FIG. 4. FIG. 4 illustrates an exploded view of the display in a preferred embodiment of the invention. As shown in FIG. 4, the display 10 includes the back plate 100, the photoelectric converting module 102, and the display module 104. In this embodiment, the display module 104 includes a backlight module 1040, a display panel 1042, and a panel tape 1044, and it is the same with the display module of ordinary liquid crystal display. The backlight module 1040 includes a reflecting plate RP, a light guide plate LGP, a frame FR, and an optical film set FS. Wherein, the reflecting plate RP is formed by the light reflective material; the optical film set FS includes a diffusion film and a prism film, but not limited to this.

Figure 1:
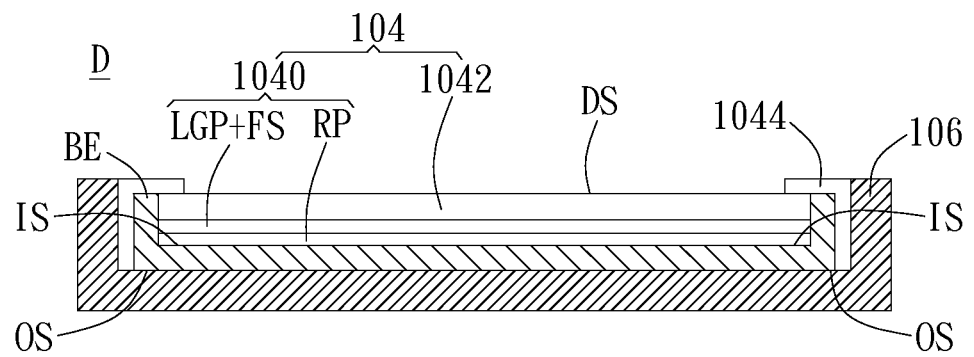
FIG. 1 illustrates a cross-sectional view of the conventional display.
Figure 5:
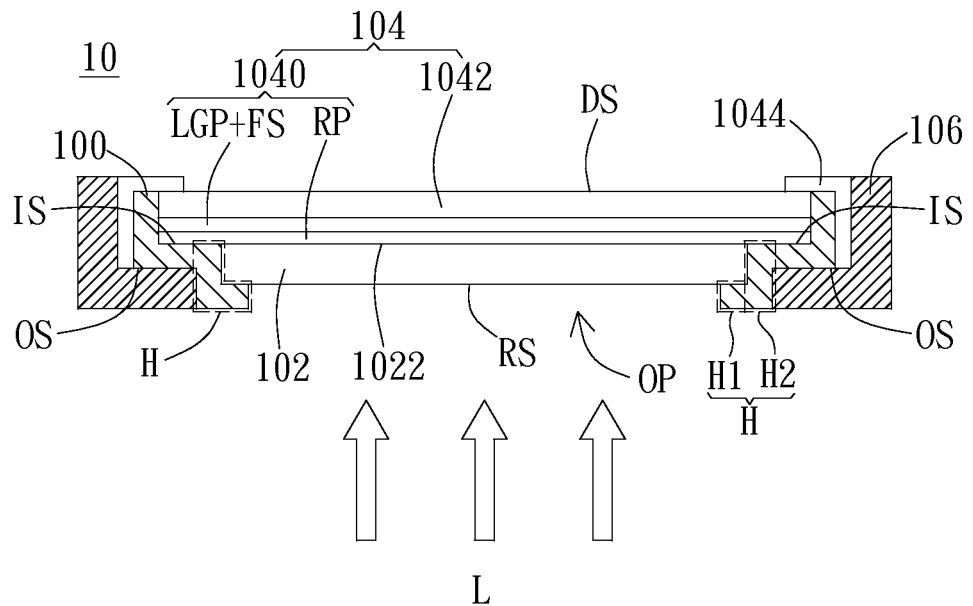
FIG. 5 illustrates a cross-sectional view of the display in a preferred embodiment of the invention.

Then, please refer to FIG. 5. FIG. 5 illustrates a cross-sectional view of the display in a preferred embodiment of the invention. Comparing FIG. 5 with FIG. 1, it can be known that the conventional back plate BE shown in FIG. 1 and the back plate 100 of the invention shown in FIG. 5 both have the inner surface IS, however, an open OP is formed on the inner surface IS of the back plate 100 of the invention, and the inner edge around the open OP on the back plate 100 is concave toward a direction back to the inner surface IS to form a supporting part H which is distributed around the open OP in a ring form. That is to say, a part of the back plate 100 of the invention is concave toward a direction back to the inner surface IS to form the concave part, and the open OP and the supporting part H around the open OP are formed at the concave part. Obviously, the open OP and the supporting part H supporting the photoelectric converting module 102 are not formed on the inner surface IS of the back plate BE of the conventional display D shown in FIG. 1. In addition, the photoelectric converting module 102 and the display module 104 of the display 10 uses the same back plate 100 without adding other components, therefore, the original process of assembling the display 10 used in factories is not necessary to be changed.

As shown in FIG. 5, the photoelectric converting module 102 is disposed on the supporting part H without protruding out of the inner surface IS. The light-receiving surface RS of the photoelectric converting module 102 is exposed to the open OP to receive lights from outside. In fact, a viscous material (e.g., viscose) can be disposed on the supporting part H in advance, so that the photoelectric converting module 102 can be firmly disposed on the supporting part H to avoid the phenomenon of falling or shaking. The reflecting plate RP of the backlight module 1040 in the display module 104 is disposed on the inner surface IS of the back plate 100 and the backlight module 1040 covers the photoelectric converting module 102.

The back plate 100 has an outer surface OS opposite to the inner surface IS, and the supporting part H protrudes out of the outer surface OS. The outer housing 106 of the display 10 covers the outer surface OS and connects with a part of the supporting part H protruding out of the outer surface OS. The photoelectric converting module has a back surface 1022 opposite to the light-receiving surface RS, and the back surface 1022 is aligned to the inner surface IS. In this embodiment, the supporting part H has an L-shaped cross-section, and the supporting part H includes an extending wall H1 and a supporting plate H2. The extending wall H1 is vertical to the inner surface IS, and the top end of the extending wall H1 connects with the inner surface IS. The supporting plate H2 connects with the bottom end of the extending wall H1 and extends toward the open OP.

The backlight module 1040 of the display module 104 is supported by the inner surface IS and covers the photoelectric converting module 102. The display panel 1042 is disposed on a surface of the backlight module 1040 opposite to the photoelectric converting module 102, that is to say, the backlight module 1040 is located between the display panel 1042 and the photoelectric converting module 102. The reflecting plate RP is adhered to the inner surface IS and limits the photoelectric converting module 102 located between the reflecting plate RP and the supporting part H, so that the photoelectric converting module 102 is clamped by the display module 104 and the supporting part H to ensure that the photoelectric converting module 102 can be firmly disposed on the supporting part H to enhance the structure stability and strength of the photoelectric converting module 102.

In practical applications, the reflecting plate RP is formed by a light reflective material. The light reflective material can be one selected from the group of Barium sulfate, Titanium oxide, Polyethyleneterephthalate (PET), Silicon dioxide, white ink, white resin, and metal, but not limited to this.

Figure 6:
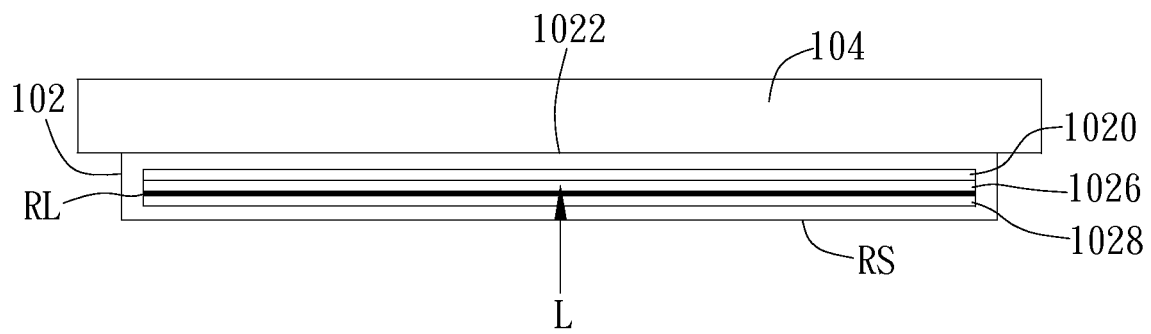
FIG. 6 illustrates a cross-sectional view of an embodiment of the inner structure of the photoelectric converting module.

Then, please refer to FIG. 6. FIG. 6 illustrates a cross-sectional view of an embodiment of the inner structure of the photoelectric converting module 102. As shown in FIG. 6, the photoelectric converting module 102 includes a bottom plate 1020, a photoelectric converting chip 1026, and a protecting plate 1028. The bottom plate 1020 is formed by an opaque material and near the backlight module 1040. The photoelectric converting chip 1026 is disposed on the bottom plate 1020. The protecting plate 1028 covers the photoelectric converting chip 1026. The light-receiving surface RS is formed at an outer side of the protecting plate 1028. A reflecting layer RL toward the photoelectric converting chip 1026 is formed at an inner side of the protecting plate 1028 toward the photoelectric converting chip 1026. And, the light L emitted from the light-receiving surface RS can pass through the reflecting layer RL and enter the photoelectric converting chip 1026.

It should be noticed that the reason why the bottom plate 1020 of the photoelectric converting module 102 is formed by the opaque material is to avoid the light leaking occurred at the front of the display 10 due to the light-permeable bottom plate 1020. In practical applications, a reflecting layer can be formed on the surface of the bottom plate 1020 toward the backlight module 1040 to replace the function of the reflecting plate RP of the backlight module 1040; therefore, the backlight module 1040 is not necessary to dispose the reflecting plate RP. However, if there is no reflecting layer formed on the surface of the bottom plate 1020 toward the backlight module 1040, the reflecting plate RP is necessary for the backlight module 1040 to prevent the display function of the display 10 from being affected.

Another embodiment of the invention is a display. In practical applications, the display can be a liquid crystal display or a self-emitting display, and the display can include a touch device or a force feedback device; the display can be disposed on an electronic apparatus, such as a notebook, but not limited to this. In this embodiment, the display includes a back plate, a photoelectric converting module, and a display module. The back plate has an inner surface and an open is formed on the back plate. The back plate has an inner edge around the open. The inner edge is concave toward the direction back to inner surface to form a supporting part. The photoelectric converting module is disposed on the supporting part without protruding out of the inner surface. The photoelectric converting module has a light-receiving surface exposed to the open. The display module is disposed on the inner surface of the back plate and the display module covers the photoelectric converting module. The display module has a display surface back to the photoelectric converting module.

In another embodiment, a part of the back plate is concave toward a direction back to the inner surface to form a concave part, and an open and a supporting part around the open are formed at the concave part. The photoelectric converting module is disposed in the concave and supported by the supporting part. The photoelectric converting module has a light-receiving surface exposed to the open. The display module is disposed on the inner surface of the back plate and covering the photoelectric converting module. The display module has a display surface back to the photoelectric converting module, and the display module and the supporting part clamp the photoelectric converting module. As to the detailed structure of the display of this embodiment, please refer to the description and figures of the above-mentioned embodiments, it is not described again here.

Compared to the prior arts, the electronic apparatus and the display thereof disclosed by the invention are integrated with a thin-type solar module having a thickness of 4 mm or less, and the solar module and the display module use the same back plate without adding additional components. The original display assembling process used in factories is not necessary to be changed to simplify the process and save the cost, and the structure stability and strength of the solar module can be also increased to enhance its reliability. By doing so, when the electronic apparatus is under the light environment, the solar module can convert the collected optical energy into the electrical energy and store the electrical energy in the battery of the electronic apparatus to extend the using time of the electronic apparatus under the condition without connecting with the mains electricity.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A display, comprising:
   an outer housing;
   a back plate having an inner surface and an open being formed on the back plate, wherein the back plate has an inner edge around the open, and the inner edge is concave toward a direction back to the inner surface to form a supporting part;
   a photoelectric converting module, disposed on the supporting part without protruding out of the inner surface, wherein the photoelectric converting module has a light-receiving surface exposed to the open; and
   a display module, disposed on the inner surface of the back plate and covering the photoelectric converting module, wherein the display module has a display surface back to the photoelectric converting module;
   wherein the back plate has an outer surface opposite to the inner surface, and the supporting part protrudes out of the outer surface, and the outer housing covers the outer surface and connects with a part of the supporting part protruding out of the outer surface.

2. The display of claim 1, wherein the supporting part comprises:
   an extending wall, being vertical to the inner surface and having a top end and a bottom end, and the top end connecting with the inner surface; and
   a supporting plate, connecting with the bottom end of the extending wall and extending toward the open;
   wherein an edge of the light-receiving surface of the photoelectric converting module is supported by the supporting plate.

3. The display of claim 1, wherein the supporting part is distributed around the open in a ring form.

4. The display of claim 1, wherein the photoelectric converting module has a back surface opposite to the light-receiving surface, and the back surface is aligned to the inner surface.

5. The display of claim 1, wherein the display module comprises:
   a backlight module supported by the inner surface and covering the photoelectric converting module; and a display panel, disposed on a surface of the backlight module opposite to the photoelectric converting module.

6. The display of claim 5, wherein the backlight module comprises a reflecting plate, the reflecting plate is adhered to the inner surface and limits the photoelectric converting module located between the reflecting plate and the supporting part.

7. The display of claim 5, wherein the photoelectric converting module has a bottom plate toward the backlight module, a reflecting layer toward the backlight module is formed on the bottom plate, and the reflecting layer reflects the lights generated by the backlight module.

8. The display of claim 5, wherein the photoelectric converting module has a bottom plate toward the backlight module, the bottom plate is light-reflective and reflects the lights generated by the backlight module.

9. The display of claim 5, wherein the photoelectric converting module comprises:
   a bottom plate formed by an opaque material and near the backlight module;
   a photoelectric converting chip disposed on the bottom plate; and
   a protecting plate covering the photoelectric converting chip, wherein the light-receiving surface is formed at an outer side of the protecting plate, and a reflecting layer toward the photoelectric converting chip is formed at an inner side of the protecting plate toward the photoelectric converting chip;
   wherein the lights generated by the backlight module penetrate through the bottom plate and then reflected by the reflecting layer.

10. The display of claim 1, wherein the thickness of the photoelectric converting module is not larger than 4 mm.

11. A display, comprising:
   an outer housing;
   a back plate having an inner surface, wherein a part of the back plate is concave toward a direction back to the inner surface to form a concave part, and an open and a supporting part around the open are formed at the concave part;
   a photoelectric converting module, disposed in the concave and supported by the supporting part, wherein the photoelectric converting module has a light-receiving surface exposed to the open; and
   a display module, disposed on the inner surface of the back plate and covering the photoelectric converting module, wherein the display module has a display surface back to the photoelectric converting module, and the display module and the supporting part clamp the photoelectric converting module;
   wherein the back plate has an outer surface opposite to the inner surface, and the supporting part protrudes out of the outer surface, and the outer housing covers the outer surface and connects with a part of the supporting part protruding out of the outer surface.

12. The display of claim 11, wherein the supporting part comprises:
   an extending wall, being vertical to the inner surface and having a top end and a bottom end, and the top end connecting with the inner surface; and
   a supporting plate, connecting with the bottom end of the extending wall and extending toward the open;
   wherein an edge of the light-receiving surface of the photoelectric converting module is supported by the supporting plate.

13. The display of claim 11, wherein the photoelectric converting module has a back surface opposite to the light-receiving surface, and the back surface is aligned to the inner surface.

14. The display of claim 11, wherein the display module comprises:
   a backlight module supported by the inner surface and covering the photoelectric converting module; and
   a display panel, disposed on a surface of the backlight module opposite to the photoelectric converting module.

15. The display of claim 14, wherein the backlight module comprises a reflecting plate, the reflecting plate is adhered to the inner surface and limits the photoelectric converting module located between the reflecting plate and the supporting part.

16. The display of claim 14, wherein the photoelectric converting module has a bottom plate toward the backlight module, a reflecting layer toward the backlight module is formed on the bottom plate, and the reflecting layer reflects the lights generated by the backlight module.

17. The display of claim 14, wherein the photoelectric converting module has a bottom plate toward the backlight module, the bottom plate is light-reflective and reflects the lights generated by the backlight module.

18. The display of claim 14, wherein the photoelectric converting module comprises:
   a bottom plate formed by an opaque material and near the backlight module;
   a photoelectric converting chip disposed on the bottom plate; and
   a protecting plate covering the photoelectric converting chip, wherein the light-receiving surface is formed at an outer side of the protecting plate, and a reflecting layer toward the photoelectric converting chip is formed at an inner side of the protecting plate toward the photoelectric converting chip.

19. The display of claim 11, wherein the thickness of the photoelectric converting module is not larger than 4 mm.

* * * * *